United States Patent
Oughton

[15] 3,692,781
[45] Sept. 19, 1972

[54] RECOVERY OF PURE CEPHALEXIN FROM ACIDIC REACTION MIXTURES

[72] Inventor: John Francis Oughton, Gerrards Cross, England

[73] Assignee: Glaxo Laboratories Limited, Middlesex, England

[22] Filed: Feb. 26, 1971

[21] Appl. No.: 119,398

[30] Foreign Application Priority Data

March 11, 1970 Great Britain............11754/70

[52] U.S. Cl. .............................................260/243 C
[51] Int. Cl. ................................................C07d 99/24
[58] Field of Search....................................260/243 C

[56] References Cited

UNITED STATES PATENTS 3,496,171  2/1970  Pfeiffer et al. ..........260/243 C
3,531,481  9/1970  Pfeiffer et al. ..........260/243 C

*Primary Examiner*—Nicholas S. Rizzo
*Attorney*—Bacon & Thomas

[57] ABSTRACT

Cephalexin is obtained in a high state of purity and in an advantageous crystalline form from impure solutions by contacting such solutions with acetonitrile, adjusting the pH to near the isoelectric point to cause an acetonitrile solvate of cephalexin to crystallize and suspending said solvate in warm water.

5 Claims, No Drawings

RECOVERY OF PURE CEPHALEXIN FROM ACIDIC REACTION MIXTURES

This invention relates to an improved process for the purification of cephalexin viz. 7β-(D-2-amino-2-phenyl-acetamido)-3-methylceph-3-em-4-carboxylic acid.

When cephalexin is recovered in crystalline form from an aqueous medium it exhibits a rod-like structure which is very hygroscopic and tends to occlude impurities resulting from its preparation. The cephalexin thereby obtained is not suitable for pharmaceutical uses and additional purification steps are required. Such additional purification steps may result in the loss of some cephalexin and it is therefore desirable to have no more than the minimum number of steps in the additional purification procedure.

We have now found that cephalexin in a high state of purity and in an advantageous crystalline form may be recovered from impure solutions by contacting such solutions with acetonitrile, adjusting the pH to near the isoelectric point to cause an acetonitrile solvate of cephalexin to crystallize, suspending said solvate in warm water and allowing said crystalline solvate to dissolve therein whereupon pure, substantially acetonitrile-free, cephalexin crystallizes out. It is of interest to note that the crystalline structure of the cephalexin recovered is different from that of the solvate from which it is derived.

Accordingly, there is provided in one embodiment of the invention a process for the purification of cephalexin containing impurities which comprises contacting an aqueous acid solution of said cephalexin with acetonitrile in quantities such that the volume of acetonitrile present is at least 70 percent of the volume of water, bringing the pH of the solution to from 3.5 to 4.5 by the addition of a base so that a crystalline acetonitrile solvate of cephalexin forms, separating the solvate thereby obtained, suspending the solvate in water at a temperature of at least 58° C, allowing said crystalline solvate to dissolve therein, and recovering pure, substantially acetonitrile-free, crystalline cephalexin from said solution.

The pure cephalexin is ordinarily recovered as large crystals having a diameter of several hundred microns and takes the form of thick plates and has a different crystalline form from that of the acetonitrile solvate. The crystalline form of cephalexin recovered from the process according to the invention is designated the β-form and X-ray crystallographic data in respect of this material are given in Table I following the Examples.

It is an advantage of the process according to the invention that reaction solutions resulting from the reduction of N-protected/esterified cephalexin may be used as the initial aqueous cephalexin solution. Thus, for example, one may use the reaction solution obtained when 2,2,2-trichloroethyl 7β-[D-N-(2,2,2-trichloroethoxycarbonyl)-2-amino-2-phenylacetamido]-3-methylceph-3-em-4-carboxylate or like precursor is reduced by, for example, zinc/acetic acid.

Acetonitrile is, preferably, added to the aqueous solution of impure cephalexin in quantities such that the volume of acetonitrile added is substantially equal to the volume of the aqueous solution of cephalexin. If desired, the formation of the acetonitrile solvate may be promoted by the addition of a water-miscible organic solvent such as, for example, a water-miscible ketone e.g. acetone. The acetonitrile solvate may be crystallized as flat needles. The crystals tend to lose acetonitrile slowly under vacuum whilst under ambient atmospheric conditions it gains 4–6 percent of water and loses substantially all of its associated acetonitrile over 2 to 3 days.

The acetonitrile solvate of cephalexin possesses a crystalline form distinct from the β-form. This crystalline form of the solvate is designated the α-form. It is of note that when the acetonitrile solvate loses its associated acetonitrile by evaporation there is no change in the crystalline form of cephalexin.

The base used to adjust the pH of the water-acetonitrile solution to a value such that the acetonitrile solvate of cephalexin crystallizes out of solution near the isoelectric point may be any water-soluble base such as, for example, an alkali metal hydrogen carbonate or preferably a lower trialkylamine, e.g., triethylamine, or ammonium hydroxide.

The aqueous solution of impure cephalexin used as starting material in the process according to the invention may be of any desired concentration. However, it has generally been found to be inconvenient to work with solutions having an initial concentration of cephalexin in excess of about 25 percent. After the addition of acetonitrile it is preferred that the concentration of the solution should be about 10 percent.

The acetonitrile solvate may be separated from the aqueous-acetonitrile medium by any convenient method such as for example filtration or centrifugation followed by washing with acetonitrile or aqueous acetonitrile and then, if desired, drying under reduced pressure. The additional step of washing the acetonitrile solvate with acetonitrile or aqueous acetonitrile is advantageous in that, when this step is employed the purity and crystalline form of the final cephalexin are enhanced.

The acetonitrile solvate may be suspended in water at a concentration of 10 to 40 percent, e.g., 20–30 percent, conveniently at about 25 percent. The temperature of the water should be at least 58° C, e.g. from 60° to 75° C, preferably from 65° to 70° C, and the formation of the β-form may be followed by visual monitoring with the aid of a microscope. The small needles of the α-form of the solvate rapidly disappear with the formation of the thick plates of the β-form. The aqueous suspension of crystals may be filtered hot, washed with cold water and dried, if desired, under reduced pressure.

It is an advantage of this process according to the invention that the cephalexin recovered is substantially free from extraneous ions.

It is a further advantage of the process according to the invention that the cephalexin is obtained in a high yield from the acetonitrile solvate.

In order that the invention may be well understood the following Examples are given by way of illustration only:

Example 1 a. Preparation of acetonitrile solvate 2,2,2-Trichloroethyl 7β-[D-(N-2,2,2-trichloroethoxy-carbonyl)-2-amino-2-phenylacetamido]-3-methyl-ceph-3-em-4-carboxylate containing 0.5 mole of methyl isobutyl ketone, (300g), was added to stirred zinc dust in 98 percent formic acid. After reaction and removal of zinc the formic acid was evaporated off and replaced with acetic acid. The solution (450 ml.) was diluted with water (400 ml.) and extracted with ether. The aqueous layer was separated and back extraction brought the total aqueous volume to 750 ml. Portions of this solution were then treated as follows:

i. Formation of acetonitrile solvate using acetone.

19.7 percent of the total volume was diluted with an equal volume of acetonitrile (150 ml.) at 35° and the solution taken to pH 4.0 with triethylamine. The suspension was diluted with acetone (300 ml.), cooled to 0° for 3 hours, filtered, washed with acetone and dried under reduced pressure at 40° to give cephalexin acetonitrile solvate, 26.29 g., $[\alpha]_D + 142.5°$ (c,0.5 in $H_2O$), $\lambda_{max}$. 263 nm $E_{1cm.}^{1\%}$ 204 ($H_2O$) with a typical nmr spectrum showing the presence of acetonitrile and a trace of acetone.

ii. Formation of acetonitrile solvate without using acetone 26.5% of the total volume was treated as in (i) with 1 volume of acetonitrile, but no acetone was added after pH adjustment. Cephalexin acetonitrile solvate, 36.32 g., $[\alpha]_D + 142.5°$ (c, 0.5 in $H_2O$), $\lambda_{max}$. 263 nm, $E_{1cm.}^{1\%}$ 208 was obtained. The infra-red spectrum in Nujol was typical of the hygroscopic crystalline form of cephalexin designated the α-form and the nmr spectrum typical of cephalexin containing acetonitrile. Note: The calculated $[\alpha]_D$ for the acetonitrile solvate, based on an $[\alpha]_D$ of 154° for cephalexin, is +138°. As samples lose acetonitrile at an appreciable rate under the normal drying conditions the specific rotations lie between the two figures.

b. Recrystallization of cephalexin

The cephalexin acetonitrile solvate obtained in (ii) (10.0g) was suspended in water (30 ml.) stirred and maintained at 65°- 70°. After 5 minutes the suspension changed in nature and large well defined crystals became clearly visible under the microscope. After a further 5 minutes had elapsed the suspension was filtered hot, the product washed by displacement with cold water (40 ml.) and dried at 40° in vacuo to yield cephalexin, 7.79 g. (87 percent recovery assuming the starting material was a full solvate), $[\alpha]_D + 154°$ (c, 0.5 in $H_2O$), $\lambda_{max}$. 263nm., $E_1cm.^1$ 233 (both calculated to dry material), moisture content by Karl Fischer 0.7 percent, acetonitrile (TLC) 0.1 percent. The infra-red spectrum was typical of the β-form of cephalexin and the nmr spectrum resembled that of the standard with no detectable impurities. Since the wt/wt. yield in (b) was 77.9 percent the overall yield from the starting material was 71 percent to dry cephalexin.

Example 2

The reaction of Example 1(a) was repeated on the same scale. The combined aqueous layers from the ether extraction were diluted with an equal volume of acetonitrile over 15 minutes. Crystallization of the solvate began toward the end of the addition. A further volume of acetonitrile was added with stirring over 15 minutes. The slurry was then brought to pH 4.0 with aqueous ammonia solution (0.880 diluted with an equal volume of water) added over 20 minutes. The suspension was cooled to 0°, filtered and washed with 80 percent acetonitrile - water (500 ml.), acetonitrile (1000 ml.) by displacement and dried under vacuum at 40° for 3–4 hours to give cephalexin acetonitrile solvate 132.32 g. $[\alpha]_D + 142°$ (c, 0.5 in $H_2O$), $\lambda_{max}$. 263 nm $E_{1cm.}^{1\%}$ 222.

This material (127.32 g.), was added to rapidly stirred water (380 ml.) maintained at 65°- 70°. The suspension was stirred for 10 minutes and then partial vacuum was applied until boiling ceased (about 30 minutes). The suspension was filtered off, washed with cold water (200 ml.) by displacement and dried under reduced pressure at 40° overnight to yield thick, plate-like crystals of cephalexin 104.53 g. 73.3 percent theory overall, $[\alpha]_D + 152°$ (c, 0.5 in $H_2O$), $\lambda_{max}$. 263 nm, $E_{1cm.}^{1\%}$ 238. Infra-red spectrum typical for the β-form of cephalexin and the nmr spectrum typical for the pure compound with no observable impurities.

Example 3

Crude cephalexin (200 g) was suspended in cold water (400 ml.). The suspension was dissolved by adding concentrated hydrochloric acid (50 ml.) diluted with water (50 ml.) to give an orange colored solution. Activated charcoal (10 g) was added and the suspension stirred for 30 minutes and then filtered through a prepared kieselguhr bed. The bed was washed with water (50 ml.). The yellow filtrate and washing were combined and mixed with acetonitrile (500 ml.). Ammonia solution (0.88 s.g.) was added steadily to the stirred solution over a period of 15 minutes with seeding until the pH had risen from 1.7 to 4.5. The thick white slurry of crystals was stirred for a further 10 minutes at 20°, filtered and washed with aqueous acetonitrile (1:1, 750 ml.) by displacement. The solvate was dried under vacuum at 40° overnight to give a white electro-static powder (199 g) containing less than 0.5 mole acetonitrile (infra-red spectrum).

The solvate (189g, 95 percent of the product) was suspended in water at 75° (600 ml) and stirred. The suspension thinned slightly after 5 minutes and became granular. Microscopic examination showed the change from the small needle α-form to the thick, plate-like crystals of the β-form to be complete. The suspension was stirred for a total of 20 minutes at 75°, filtered hot and washed with cold water (750 ml) by displacement. The product was dried under vacuum overnight to give pure cephalexin as a white crystalline powder (158 g. 83 percent overall recovery), $(\alpha)_D + 154°$ (c, 0.5 in $H_2O$), $\lambda_{max}$. 262 nm, $E_{1cm.}^{1\%}$ 227, infra-red spectrum (Nujol) characteristic of the β-form of cephalexin with no trace of acetonitrile at $2245 cm^{-1}$. The p.m.r. spectrum in $D_2O$/trifluoracetic acid was identical with that of the authentic pure material.

Example 4

An aqueous reaction liquor obtained as in Example 1 from 81.25g. starting material had a volume of 180 ml. Acetonitrile (180 ml.) was added over 30 seconds with stirring. The pH rose from 2.45 to 3.35 and crystallization commenced after 5 minutes. The stirrer was stopped and then restarted 5 minutes later. The suspension was stirred for 5 minutes when the pH had fallen to 2.8. Triethylamine was added in 2 ml. portions every 2 minutes until the pH had reached 4.5 (19.3 ml. total). The suspension was cooled to 10° for 3 hours and then filtered. The filter cake was washed by displacement with acetonitrile-water (1:1; 90 ml.) and acetonitrile (90 ml.) and dried in vacuum at 40° overnight to give the solvate 34.15 g.; $[\alpha]_D^{20} + 148°$ (c, 0.5, $H_2O$) (yield based on $[\alpha]_D$ = 32.8 g.; 82 percent theory); $\lambda_{max}$. 261.5 nm $E_{1cm.}^{1\%}$ 219 ($H_2O$).

The product (15 g.) was added to stirred water (50 ml.) at 70° and the temperature held for 5 minutes. The purified cephalexin was filtered off, washed with cold water (20 ml.) and dried in vacuum overnight to give 13.28 g. (91.5 percent stage yield; 75 percent overall yield); $[\alpha]_D^{20}$ + 153° (c, 0.52, $H_2O$), possessing the typical large prism-structure when observed under the microscope.

X-ray crystallographic data in respect of the $\alpha$ and $\beta$ crystalline forms of cephalexin referred to above are given in the following tables. Interplanar spacings [d(A.)b as measured from using copper $K\alpha$-radiation are given as well as the relative intensities of the lines according to the following arbitary basis:

```
s = strong              v = very
m = medium              f = faint
w = weak                d = diffuse
```

TABLE I $\beta$-form cephalexin

| d (A.) | I | d (A.) | I |
|---|---|---|---|
| 15.55 | s | 3.53 | vw |
| 11.86 | s | 3.48 | vw |
| 10.67 | m | 3.26 | vwd |
| 9.47 | vw | 3.13 | m |
| 8.28 | w | 3.06 | m |
| 7.93 | w | 2.94 | w |
| 5.87 | vw | 2.89 | w |
| 5.76 | vw | 2.86 | m |
| 5.49 | w | 2.76 | m |
| 5.33 | vs | 2.69 | w |
| 5.21 | m | 2.65 | w |
| 4.86 | m | 2.62 | wd |
| 4.73 | wd | 2.58 | vw |
| 4.48 | w | 2.57 | vw |
| 4.33 | m | 2.51 | vw |
| 4.16 | m | 2.47 | vw |
| 4.02 | vw | 2.42 | wd |
| 3.95 | w | 2.40 | w |
| 3.90 | vw | 2.26 | wd |
| 3.87 | vw | 2.10 | vw |
| 3.81 | m | 1.86 | vw |
| 3.73 | m | 1.85 | vw |
| 3.57 | md | 1.84 | vwd |

TABLE II

Acetonitrile solvate—$\alpha$-form

| d | I | d | I |
|---|---|---|---|
| 9.60 | s | 3.18 | m |
| 8.62 | m | 3.10 | m |
| 6.80 | m | 3.05 | w |
| 6.37 | m | 3.00 | w |
| 5.68 | m | 2.95 | w |
| 5.53 | s | 2.90 | vw |
| 5.33 | w | 2.86 | vw |
| 4.72 | w | 2.75 | wd |
| 4.60 | s | 2.71 | vw |
| 4.14 | vs | 2.61 | w |
| 3.93 | m | 2.55 | wd |
| 3.50 | vw | 2.32 | vwd |
| 3.37 | m | 2.07 | vw |
| 3.32 | m | | |

I claim:

1. A process for the recovery of cephalexin high purity from a crude acidic aqueous solution of cephalexin resulting from the reduction of N-protected/esterified cephalexin, comprising contacting said solution with acetonitrile in quantities such that the volume of acetonitrile present is at least 70 percent of the volume of water, bringing the pH of the solution to from 3.5 to 4.5 by the addition of a base so that a crystalline acetonitrile solvate of cephalexin forms, separating the solvate thereby obtained, suspending the solvate in water at a temperature of at least 58° C, allowing said crystalline solvate to dissolve therein, and recovering pure, substantially acetonitrile-free, crystalline cephalexin from the resulting solution.

2. A process as claimed in claim 1 wherein the initial aqueous cephalexin solution is a reaction solution obtained by reduction in solution of 2,2,2-trichloroethyl 7$\beta$-[D-N-(2,2,2-trichloroethoxycarbonyl)-2-amino-2-phenylacetamido]-3-methylceph-3-em-4-carboxylate.

3. A process as claimed in claim 1 wherein acetonitrile is added to the aqueous solution of impure cephalexin in quantities such that the volume of acetonitrile added is substantially equal to the volume of the aqueous solution of cephalexin.

4. A process as claimed in claim 1 wherein formation of the acetonitrile solvate is promoted by the addition of a water-miscible ketone.

5. A process as claimed in claim 1 wherein the crystalline acetonitrile solvate separated from the aqueous solution is washed with acetonitrile or aqueous acetonitrile.

* * * * *